United States Patent

[11] 3,627,051

| [72] | Inventors | James E. Schmitz |
| | | Ventura; |
| | | Duard J. Suby, Clear Lake; Donald E. Ransom, Ventura, all of Iowa |
| [21] | Appl. No. | 5,741 |
| [22] | Filed | Jan. 26, 1970 |
| [45] | Patented | Dec. 14, 1971 |
| [73] | Assignee | James F. Rhodes |
| | | Mason City, Ind. |
| | | a part interest |

[54] DEBRIS-GATHERING MEANS
16 Claims, 15 Drawing Figs.

[52] U.S. Cl. ..................................................... 171/89, 171/133
[51] Int. Cl. .......................................................... A01d 17/06
[50] Field of Search ............................................ 171/63, 89, 97, 133

[56] References Cited
UNITED STATES PATENTS

| 1,760,203 | 5/1930 | Menke ........................ | 171/89 |
| 1,771,541 | 7/1930 | Larsen ........................ | 171/133 |
| 1,864,484 | 6/1932 | Currie ......................... | 171/133 |
| 2,491,079 | 12/1949 | Bestland ..................... | 171/63 |
| 2,718,110 | 9/1955 | Butler ......................... | 171/89 |
| 2,972,383 | 2/1961 | Erdman ....................... | 171/133 |
| 3,356,158 | 12/1967 | Deaver et al. ................ | 171/63 |

*Primary Examiner*—Antonio F. Guida
*Attorney*—Zarley, McKee & Thomte

ABSTRACT: A debris-gathering means comprising a wheeled frame means having a forwardly extending tongue portion secured to a prime mover. A rotor means extends across the forward end of the frame means and is adapted to penetrate the ground and to remove debris therefrom and to convey the debris rearwardly to a conveyor means extending outwardly and rearwardly therefrom. The rotor means includes front, intermediate and rear loaders. The conveyor means conveys the debris to a hopper means at the rearward end of the frame means. The hopper means is emptied by actuating a hydraulically operated dumping gate. Means is also provided for raising and lowering the rotor means with respect to the ground.

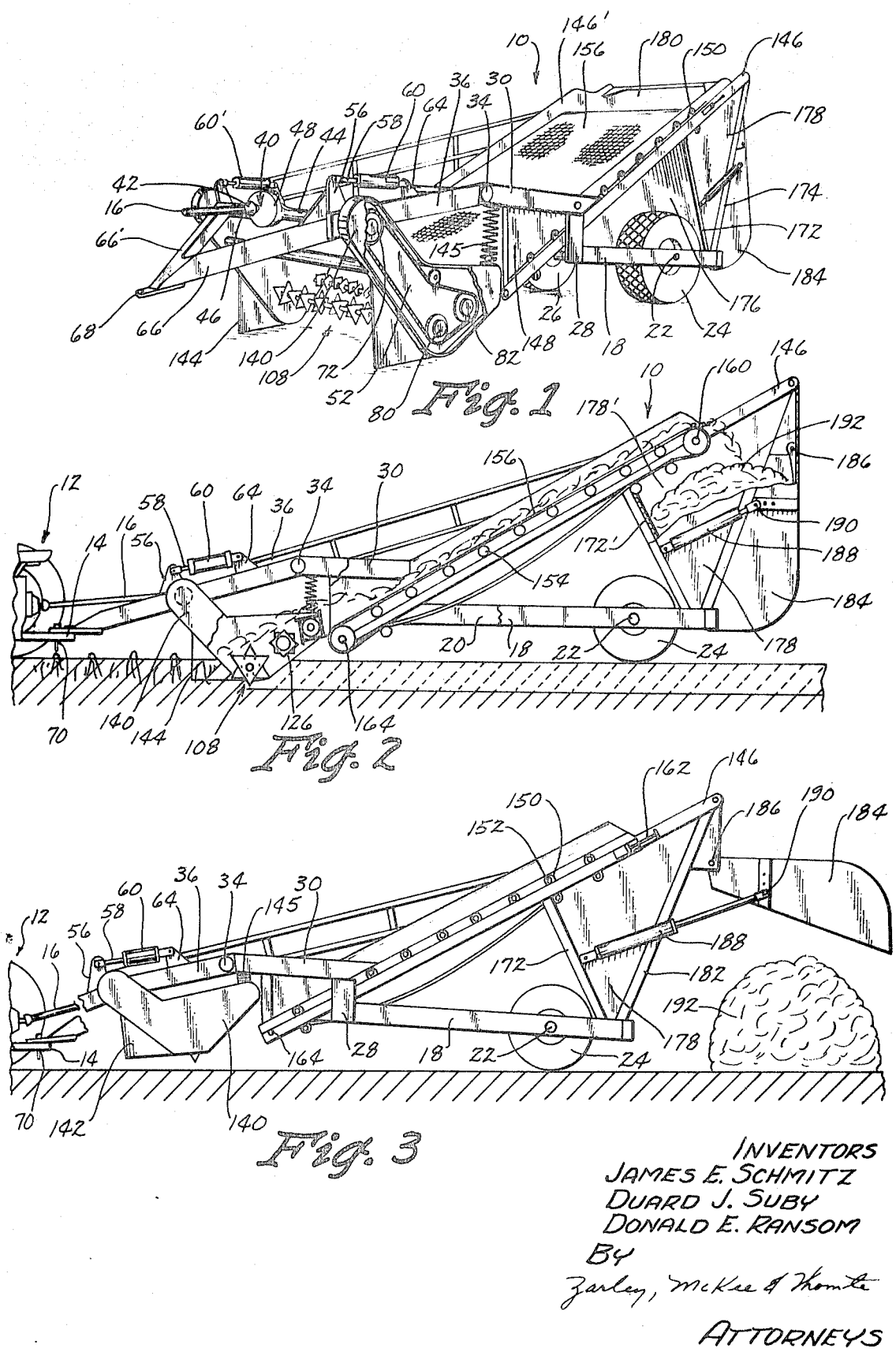

Patented Dec. 14, 1971
3,627,051
3 Sheets-Sheet 2
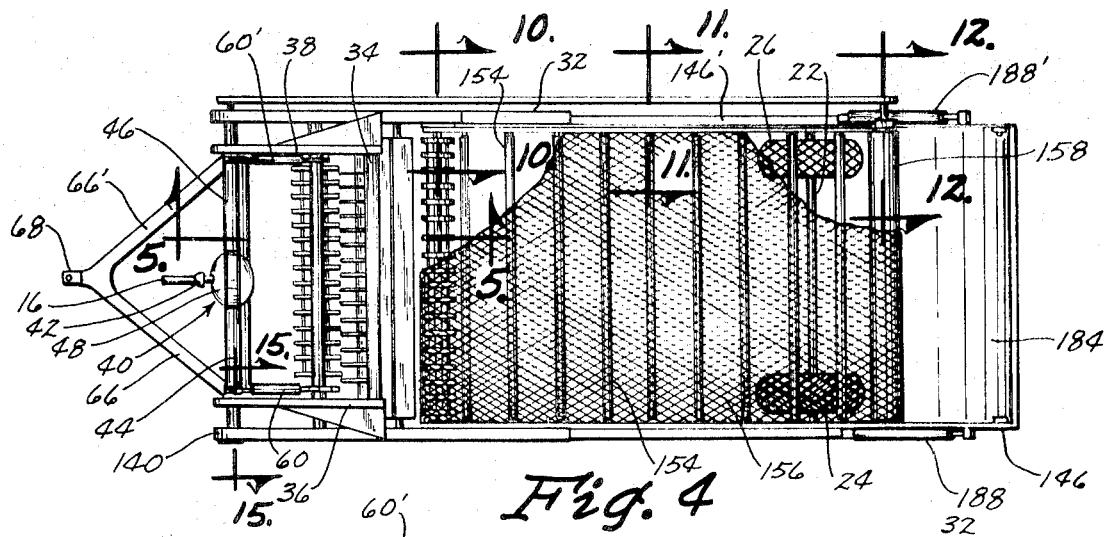
Fig. 4
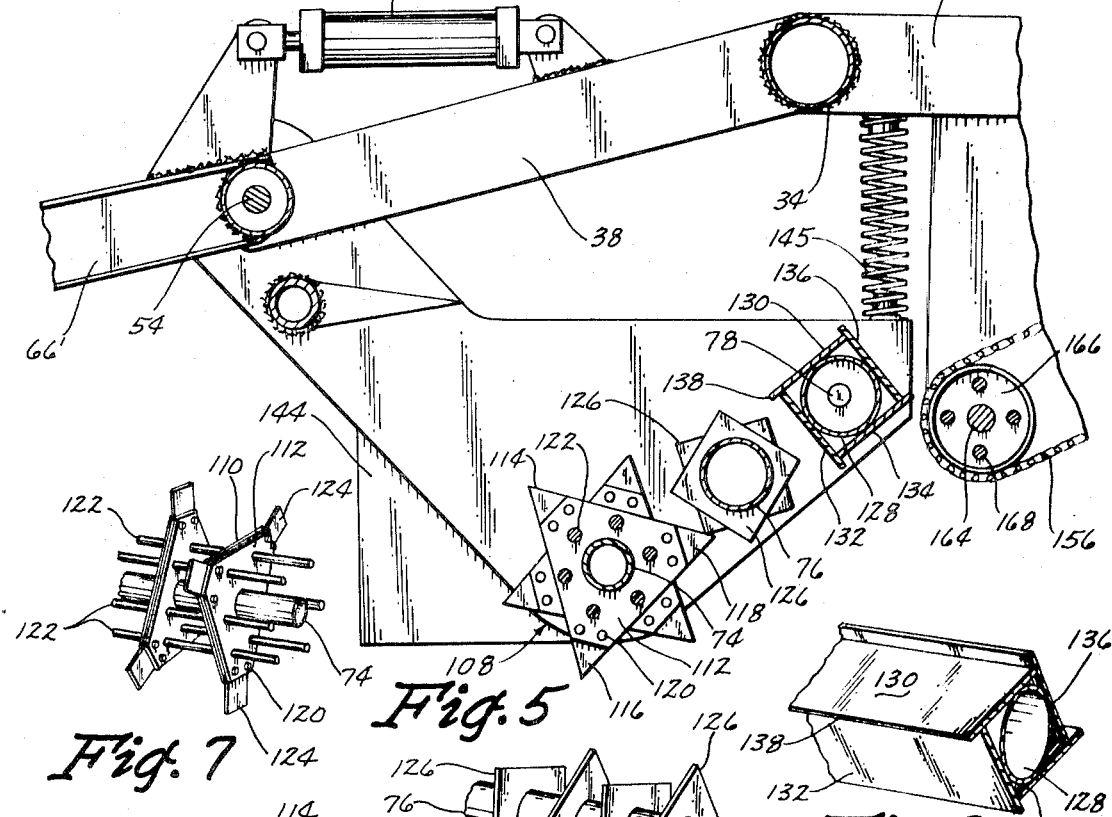
Fig. 5
Fig. 7
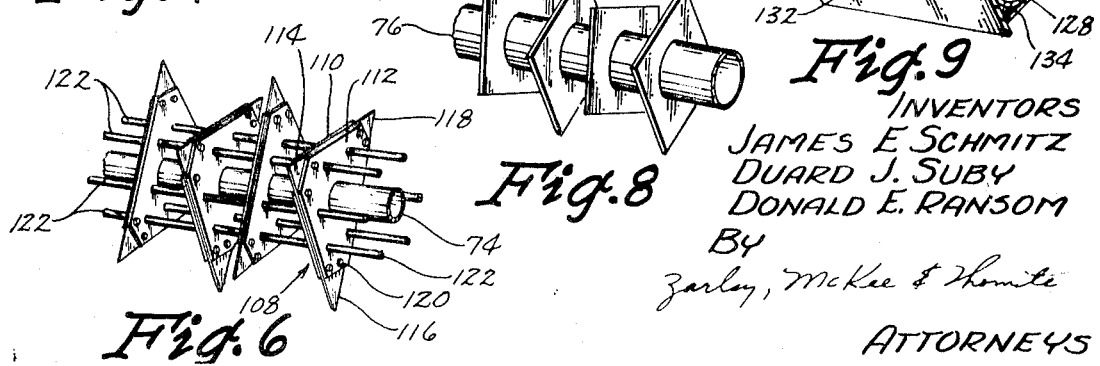
Fig. 8
Fig. 9
Fig. 6
INVENTORS
JAMES E. SCHMITZ
DUARD J. SUBY
DONALD E. RANSOM
BY
Zarley, McKee & Thomte
ATTORNEYS INVENTORS
JAMES E. SCHMITZ
DUARD J. SUBY
DONALD E. RANSOM
BY
Zarley, McKee & Thomte
ATTORNEYS

DEBRIS-GATHERING MEANS

Generally, the first step in ground-clearing operations is the removal of trees and stumps form the area by means of a bulldozer or the like. A great deal of debris such as branches and roots remain on the ground after the bulldozing operation and must be manually collected or picked. Even after the debris lying on the ground has been picked the ground is not satisfactorily cleared due to the large amount of roots which are buried in the soil. The root problem is generally solved by tilling the soil with suitable tillage equipment and then manually picking the roots that have been worked to the surface. The tillage and root-picking operations must be repeated until the roots have been sufficiently removed.

Therefore, it is the principal object of this invention to provide a debris-gathering means.

A further object of this invention is to provide a debris-gathering means for use in ground-clearing operations.

A further object of this invention is to provide a debris-gathering means which is adapted to remove the roots from the ground in ground-clearing operations.

A further object of this invention is to provide a debris-gathering means including a rotor means at the forward end thereof which removes the roots from the soil and which removes the dirt from the roots being so removed.

A further object of this invention is to provide a debris-gathering means having a vertically movable rotor means at the forward end thereof.

A further object of this invention is to provide a debris-gathering means having a hopper means at the rearward end thereof.

A further object of this invention is to provide a debris-gathering means including an overriding clutch means for preventing damage to the device.

A further object of this invention is to provide a debris-gathering means wherein the debris load retains its shape formed in the hopper when it is dumped and it is unloaded by a gate swinging out while the load drops straight down.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a front perspective view of the device of this invention.

FIG. 2 is a side elevational view of the device with portions thereof cut away to more fully illustrate the invention.

FIG. 3 is a side elevational view of the device illustrating the hopper means being dumped.

FIG. 4 is a top view of the device with portions thereof cut away to more fully illustrate the invention.

FIG. 5 is an enlarged sectional view as seen along lines 5—5 of FIG. 4.

FIG. 6 is a partial front perspective view of the front rotor.

FIG. 7 is a partial front perspective view of a modified form of the front rotor.

FIG. 8 is a partial front perspective view of the intermediate rotor.

FIG. 9 is a partial front perspective view of the rear rotor.

Figure 12:
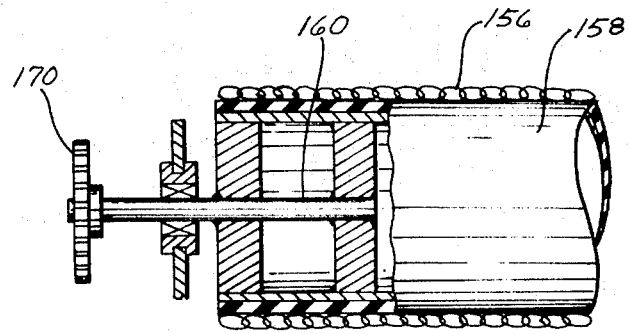
FIG. 12 is an enlarged sectional view as seen along lines 12—12 of FIG. 4 with portions thereof cut away to more fully illustrate the invention.
Figure 11:
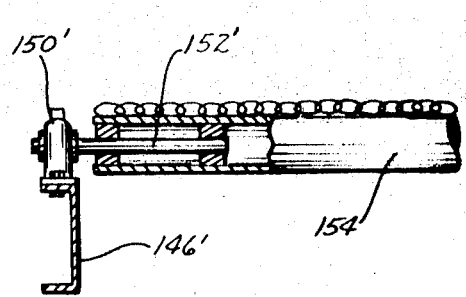
FIG. 11 is an enlarged sectional view as seen along lines 11—11 of FIG. 4 with portions thereof cut away to more fully illustrate the invention.

The debris-gathering machine of this invention is designated by the reference numeral 10 and is designed to be pulled by a prime mover such as a tractor 12 or the like having a rearwardly extending drawbar 14. Tractor 12 has a conventional PTO shaft 16 extending rearwardly therefrom for powering the rotor means and conveyor means on the machine 10 as will be described hereinafter in greater detail.

Machine 10 includes a pair of frame members 18 and 20 having an axle 22 extending therebetween (FIG. 4) adjacent the rearward ends thereof. Wheels 24 and 26 are rotatably mounted on axle 22 for supporting the rearward end of the machine. Brace 28 is secured to the forward end of frame member 18 and extends upwardly therefrom as shown in FIG. 1. A brace 28' (not shown) is secured to the forward end of frame member 20 and extends upwardly therefrom. It should be noted that brace 28' is identical to brace 28.

Figure 15:
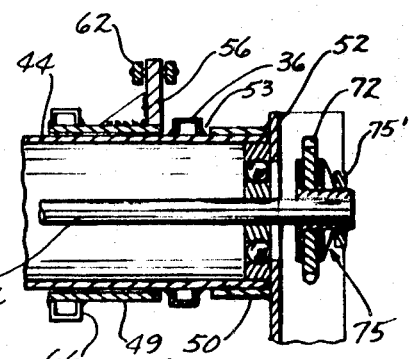
FIG. 15 is a cross-sectional view taken along lines 15—15 in FIG. 4.

Frame members 30 and 32 are rigidly secured to the upper ends of braces 28 and 28' respectively, and extend forwardly therefrom. Pipe 34 is rigidly connected to the forward ends of frame members 30 and 32 by welding or the like and extends therebetween. Frame members 36 and 38 are rigidly secured to pipe 34 by welding or the like and extend forwardly and slightly downwardly therefrom in a spaced-apart parallel relationship. The numeral 40 refers generally to a differential mechanism which is connected to the shaft 16 by a universal joint means 42. A pair of hollow housing members 44 and 46 are secured to the housing 48 of the differential 40 and extend outwardly therefrom. The end of housing member 44 is received in a pipe or sleeve 49 and in a pipe 50 which is rigidly secured to a side panel 52 by welding or the like. As seen in FIG. 15, the pipes 49 and 50 rotate around member 44. The panels 52 and 52' are free to rotate on the member 44. Forward end of member 36 extends between the pipes 49 and 50 into an annular space 53 and is secured by welding to end of housing member 44. The numeral 54 designates the drive shaft extending outwardly from the differential 40. Bracket 56 is welded to the pipe 49 and extends upwardly therefrom. The upper end of bracket 56 is secured to the rod 58 of a hydraulic cylinder 60 by means of a pin 62. The other end of hydraulic cylinder 60 is pivotally connected to a bracket 64 which is rigidly secured to the frame member 36. A tongue member 66 is rigidly secured by its rearward end to pipe 49 and extends forwardly and inwardly with respect thereto. The numeral 66' refers generally to a tongue member 66 and extends rearwardly and outwardly therefrom as illustrated in FIG. 1. The numeral 60' refers to a hydraulic cylinder identical to hydraulic cylinder 60 and which serves the same function but which is positioned at the other side of the machine. The hydraulic cylinder 60' is operatively connected to the side panel 52' in the same manner in which the hydraulic cylinder 60 is operatively connected to the side panel 52 at the opposite side of the machine. The tongue members 66 and 66' are provided with a hitch portion 68 adapted to be loosely connected to the tractor drawbar 14 by a suitable pin 70 or clevis such that the tongue and hitch may pivot up and down relative to the drawbar of the tractor. For purposes of description, the numeral 54' designates a shaft extending outwardly from differential 40 and extends outwardly through the side panel 52'.

The other end of shaft 54 is positioned inside panel 52 and has a sprocket 72 mounted thereon which includes an override clutch or slip clutch 75. The frictional contact between the slip clutch halves and the sprocket 72 is adjustable by a operation of tightening nut 75'. Rotor shafts 74, 76 and 78 have one end thereof rotatably extending through side panel 52 as illustrated in FIG. 1. Shafts 74 and 76 have sprockets 80 and 82 mounted thereon respectively. Chain 84 extends around the sprockets 72, 80 and 82 and also around the idler sprocket 86 in the manner illustrated in FIG. 13.

Figure 13:
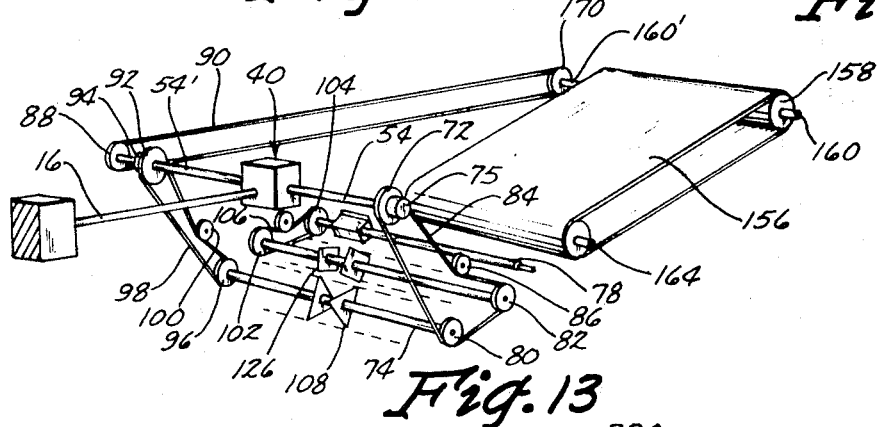
FIG. 13 is a front perspective view illustrating the power train of the invention.

Shaft 54 extends through the side panel 52' and has a sprocket 88 having a chain 90 received thereon. Sprocket 92 is mounted on shaft 52' and includes an override clutch or slip clutch mechanism 94. Sprocket 96 is mounted on the other end of shaft 74 as illustrated in FIG. 13. Chain 98 extends around sprockets 92 and 96 and beneath the idler sprocket 100 as also shown in FIG. 13. Sprockets 102 and 104 are mounted on the ends of shafts 76 and 78 respectively and have a chain 106 mounted thereon.

Shaft 74 has a plurality of spaced-apart rotor blades 108 mounted thereon in a spaced-apart relationship as illustrated in FIG. 6. Each of the blades 108 comprises a pair of spaced-apart plates 110 and 112 having triangular-shaped blade portions 114, 116 and 118 positioned therebetween and extending outwardly therefrom as illustrated in FIG. 6. The blade portions are maintained between the plates 110 and 112 by means of bolts 120 extending therethrough. It can be seen in FIG. 6 that the blades 108 are generally triangular in shape and that each adjacent rotor blade is offset with respect thereto approximately 60°. A plurality of spaced-apart rods 122 extend through the rotor blades 108 as illustrated in FIG. 6. FIG. 7 illustrates a modified form of the blade portions which may be substituted for the blade portions 118 of FIG. 6. It can be seen in FIG. 7 that the blade portions 124 are generally rectangular in shape rather than the triangular-shaped blades of FIG. 6.

Shaft 76 has a plurality of spaced-apart plates 126 mounted thereon for rotation therewith. It can be seen in FIG. 8 that each adjacent plate 126 is offset with respect to the next adjacent plate approximately 45°. Shaft 78 includes an enlarged diameter portion 128 having four elongated plates 130, 132, 134 and 136 secured to the exterior thereof in the manner illustrated in FIG. 9 so that each of the plates has an edge portion 138 extending outwardly beyond the plane of the next adjacent plate. The plates 130, 132, 134 and 136 may be secured to the large diameter portion 136 by any convenient means such as welding or bolts.

Side panel 52 is provided with a cover 140 mounted thereon so as to keep dust and the like from the sprockets and chains. Side panel 52' also includes a cover similar to cover 140. As seen in FIG. 1, the side panels 52 and 52' have shoes 142 and 144 secured thereto respectively which extend therefrom and which are adapted to penetrate the ground as illustrated in FIG. 2. Side panel 52 is also provided with a spring means 145 extending upwardly from the upper rearward end to the frame member 30 (FIG. 3) which limits the upward pivotal movement of the side panel with respect to the frame member 30. The side panels are full floating under spring tension at all times.

Figure 10:
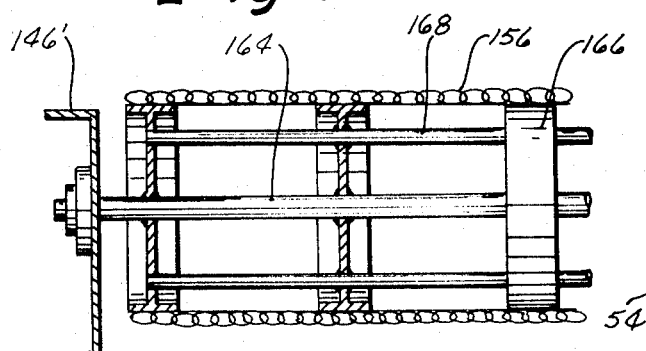
FIG. 10 is an enlarged sectional view as seen along lines 10—10 of FIG. 4.

A channel member 146 is secured to frame members 18 and 30 and brace 28 and extends upwardly and rearwardly therefrom as illustrated in FIG. 1. As seen in FIG. 1, the lower end of channel member 146 is positioned forwardly and downwardly of the forward end of frame member 18. Shield 148 extends between the channel member 146 and frame member 30 as shown in FIG. 1. Channel member 146' is provided that the other side of the machine is identical to channel member 146. Channel members 146 and 146' have a plurality of bearings 150 and 150' secured thereto respectively which rotatably support opposite ends of shafts 152 and 152' respectively. The shafts 152 and 152' have rollers 154 secured thereto adapted to support a conveyor chain generally designated by the reference numeral 156 thereon. Conveyor chain 156 is of the endless type and is comprised of a plurality of spaced-apart chain links secured together. The upper end of the conveyor chain 156 is supported by a roller 158 having shafts 160 and 162 secured thereto and extending from opposite ends thereof which are suitably rotatably supported on the channels 146 and 146'. A suitable conveyor chain tightening means is provided for the roller 158 and is generally designated by the reference numeral 162. The lower end of the conveyor chain 156 is rotatably supported in the manner illustrated in FIG. 10. Shaft 164 is rotatably mounted in and extends between the forward ends of the channel members 146 and 146'. A plurality of spaced-apart wheels 166 are secured to the shaft 164 as illustrated in FIG. 10. As seen in FIG. 10, a plurality of rods 168 are secured to and extend between the wheels 166 in a spaced-apart relationship. The conveyor chain 156 extends around the periphery of the wheels 166 as seen in FIG. 10. A conveyor chain 156 is driven by means of chain 90 extending around sprockets 170 on shaft 160'.

Supports 172 and 174 are secured to the rearward end of frame member 18 and extend upwardly therefrom to the upper end of channel member 146 for support thereof. It should be noted that supports identical to supports 172 and 174 extend upwardly from the rearward end of frame member 20 to the upper end of channel member 146'. Wall member 176 is secured to support 172 and extends from support 172 to the support at the other side of the machine which is identical to support 172 and which is designated by the reference numeral 172' in FIG. 2.

Wall member 178 extends between the supports 172 and 174 and it should be understood that a wall member 178' is provided on the opposite side of the machine. Thus, wall members 176, 178 and 178' form three sides of a hopper means having an open hopper end 180 and an open rearward end 182 which is closable by a hopper gate generally designated by the reference numeral 184. Hopper gate 184 is pivotally connected at its upper end to the machine at 186 and is pivotally moved from the position of FIG. 2 to the position of FIG. 3 by the hydraulic cylinders 188 and 188'. Forward end of hydraulic cylinder 188 is pivotally connected to the support 172 and has its rod end pivotally connected to the hopper gate 184 at 190. Hydraulic cylinder 188' is connected at its forward end to support 172' and is pivotally connected at its broad end to hopper gate 184. Thus, when hopper gate 184 is in the position of FIG. 2, a closed hopper means is provided at the rearward end of the machine adapted to receive the debris 192 therein which may be dumped therefrom when the hopper gate 184 is pivoted to its open position illustrated in FIG. 3.

Figure 14:
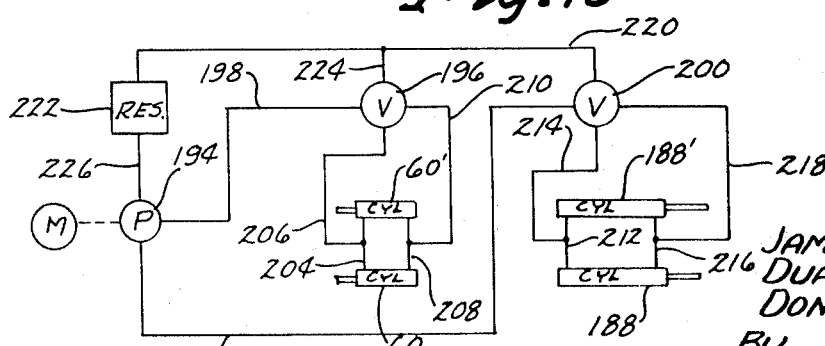
FIG. 14 is a schematic view illustrating the hydraulic circuitry of the invention.

The hydraulic circuit of the invention is illustrated in schematic 4 in FIG. 14 wherein the numeral 194 generally designates the tractor hydraulic pump. Pump 194 is connected to valve 196 by conduit 198 while pump 194 is connected to a valve 200 by means of conduit 202. Conduit 204 fluidly connects one end of the cylinders 60 and 60'. Conduit 204 is fluidly connected to the valve 196 by conduit or hose 206. The other ends of cylinders 60 and 60' are fluidly connected by means of conduit 208 which is connected to valve 196 by conduit 210. Conduit 212 fluidly connects one end of the cylinders 188 and 188' and is fluidly connected to the valve 200 by conduit 214. Conduit 216 fluidly connects the other ends of the hydraulic cylinders 188 and 188' and is connected to the valve 200 by conduit 218. Conduit 220 fluidly connects valve 200 with reservoir 222. Conduit 224 fluidly connects valve 196 with the conduit 220. Reservoir 222 is fluidly connected to the pump 194 by conduit 226.

In operation, the machine 10 is pulled through the area to be cleared of debris with the hydraulic pump of the tractor being used to power the hydraulic cylinders on the machine. Valve 196 is operated so as to cause the extension of the cylinder rods of hydraulic cylinders 60 and 60' which causes the side panels 52 and 52' to be pivoted upwardly and rearwardly with respect to the ground which maintains the rotors out of ground-engaging position (FIG. 3). When it is desired to remove the debris from the ground, the tractor PTO is activated so rotational power is applied to the differential 40 which causes the shafts 54 and 54' to be rotated in a clockwise direction as viewed in FIG. 13. The hydraulic cylinders 60 and 60' are also operated so as to pivot the rotors from the position of FIG. 3 to the position of FIG. 2 which causes the shoes 142 and 144 to penetrate the ground with the front rotor penetrating the ground. The pulley arrangement on the shafts 74, 76 and 78 is such that shaft 76 is rotated at a greater speed than shaft 74 and with shaft 78 being rotated at a faster speed than shaft 76. The rotation of shaft 54' also causes the conveyor chain 156 to be operated so that any debris placed thereon would be conveyed upwardly and rearwardly and dumped therefrom into the hopper means at the rear end of the machine. The rotating rotor blades 108 on shaft 74 cut the roots and pull them from the ground as the machine is being moved by the tractor. The front rotor not only pulls the roots from the ground but also conveys the same upwardly and rearwardly while shaking dirt therefrom. The dirt which is removed from the roots can pass downwardly therefrom. The dirt which is removed from the roots can pass downwardly therefrom due to the spaced-apart relationship of the blades 108 and the spaced-apart rods 122. Further, the dirt that is removed from the roots can also pass downwardly between the rotors themselves. The rotating plates 126 on shaft 76 further shake the dirt from the roots with the dirt dropping downwardly onto the ground between the adjacent plates 126. Plates 126 convey the debris upwardly and rearwardly to the rear rotor which throws the debris onto the conveyor chain 156. If the rotors should become clogged or strike a sufficiently large foreign object, the slip clutches on the opposite ends of shafts 54 and 54' will permit the rotors to stop to prevent damage thereto.

The rotors are easily raised and lowered with respect to the ground to achieve any desired penetration thereof through the hydraulic cylinders 60 and 60' and also permits the rotors to be completely removed from the ground to pass over large foreign objects, if necessary, and to permit the machine to be placed in a transport position. When the hopper means at the rearward end of the machine becomes filled with debris, the debris may be selectively dumped therefrom by simply operating the hydraulic cylinders 188 and 188' which causes the hopper gate 184 to be pivoted from the position of FIG. 2 to the position of FIG. 3. The opening of hopper gate 184 causes the debris in the hopper means to flow therefrom by gravity. Conveyor chain 156 by being constructed of spaced-apart chain links also permits dirt to fall downwardly therethrough as the roots are being conveyed upwardly to the hopper means.

Thus it can be seen that an extremely convenient and efficient means has been provided for gathering debris. The relative positioning of the front, intermediate and rear rotors together with their respective rates of rotation insures that the roots will be efficiently removed from the ground with the dirt thereon being removed therefrom as they are being conveyed upwardly and rearwardly. The convenient positioning of the three rotors with respect to the ground insures that the operator can efficiently gather debris on the area to be cleared. It is appreciated that operation of the hydraulic cylinders 60 and 60' cause rapid lifting and lowering of the rotary blade unit 108 carried on the side panels 50 and 52' due to the fact that the pivotal movement occurs about the axis of the shaft 54 in the hollow housing members 44 and 46 whereby the tongue members 66 and 66' pivot towards and away from the rear frame members 36 and 38 integrally secured to the pipe 34. It is seen that the forward end of the tongue members 66 and 66' thus move towards and away from the rear end of the unit which may be visualized as the wheels 24 engaging the ground. The connection through a clevis or the like of the tongue to the drawbar 14 is loose enough to permit the angle of the tongue relative to the drawbar to vary as it is necessary to permit the pivotal movement of the tongue. Thus the free-floating rotary blade unit 108 engages the ground through action of gravity. The springs 145 additionally serve to maintain pressure downwardly on the unit 108.

Additionally, it is seen that the shape of the debris load 192 formed by the bucket 184 is retained when the debris load 192 is dumped onto the ground as seen in FIG. 3 due to the fact that the bucket 184 is pivoted vertically upwardly permitting the load to drop straight down onto the ground. Thus it can be seen that the machine accomplishes at least all of its stated objectives.

We claim:

1. A debris-gathering means, comprising,
a wheeled frame means having opposite sides, rearward and forward end, and a forwardly extending tongue portion pivoted to the forward end of said frame means and adapted to be secured at its forward end to a prime mover,
a panel extending downwardly and rearwardly from said tongue portion and said frame means, pivotal about the pivotal axis between said frame means and said tongue portion,
a powered rotor means extending across the lower end of said panel below said pivotal axis adapted to selectively penetrate the ground and to convey debris upwardly and rearwardly with respect to said frame means, and
a powered conveyor means on said frame means rearwardly of said rotor means extending upwardly and rearwardly therefrom adapted to receive said debris on its forward end and to convey the same upwardly and rearwardly.

2. The means of claim 1 wherein a hopper means is positioned on said frame means rearwardly of said conveyor means; said hopper means being adapted to receive the debris passing from the rearward end of said conveyor means.

3. The means of claim 2 wherein said hopper means includes a hopper gate at its rearward end which normally closes the rearward end of said hopper means, said hopper gate being pivotal about a horizontal axis from its closed position to an open position whereby the debris in said hopper means will flow outwardly therefrom.

4. The means of claim 3 wherein said hopper gate is operatively pivoted at its upper end to said hopper means, said hopper gate having a hydraulic cylinder means connected thereto for pivoting said hopper gate between its open and closed positions.

5. The means of claim 1 wherein said rotor means comprises front, intermediate and rear rotors, said front rotor including means thereon for cutting roots from the ground, said front and intermediate rotors including means for shaking dirt from the debris engaged thereby, said rear rotor adapted to deposit the debris on the forward end of said conveyor means.

6. The means of claim 5 wherein said intermediate rotor is rotated at a greater rotational rate than said front rotor, said rear rotor being rotated at a greater rotational rate than said intermediate rotor.

7. The means of claim 6 wherein said intermediate rotor is positioned in a plane above and rearwardly of said front rotor, said rear rotor being positioned in a plane above and rearwardly of said intermediate rotor.

8. The means of claim 5 wherein said front rotor comprises a rotatable drive shaft having a plurality of spaced-apart rotor blades secured thereto and extending therefrom, a plurality of spaced-apart rods extending through said rotor blades in a parallel relationship to said drive shaft.

9. The means of claim 5 wherein said intermediate rotor comprises a rotatable drive shaft having a plurality of spaced-apart plates secured thereto and extending therefrom, said plates being rotationally offset with respect to the next adjacent plates.

10. The means of claim 5 wherein said rear rotor comprises a rotatable drive shaft having four elongated, rectangular plates secured thereto and extending therefrom, each of said plates being offset with respect to the next adjacent plate approximately 90° and having a width so that each plate has a leading edge spaced outwardly of the plane of the next adjacent plate.

11. The structure of claim 1 wherein said panel is substantially freely pivotal about said pivotal axis.

12. The structure of claim 11 wherein a hydraulic cylinder is connected between said frame means and said tongue portion for causing pivotal movement therebetween thereby raising and lowering said rotor means relative to the ground.

13. The structure of claim 11 wherein a spring means biases said panel downwardly for maintaining said rotor means in engagement with the ground.

14. The structure of claim 1 wherein said panel includes first and second side supports, and said rotor means is rotatably mounted in and extends between said first and second spaced-apart side supports.

15. A debris-gathering means, comprising, a wheeled frame means having opposite sides, rearward and forward ends, and a forwardly extending tongue portion adapted to be secured to a prime mover, a powered rotor means extending across the forward end of said frame means adapted to selectively penetrate the ground and to convey debris upwardly and rearwardly with respect to said frame means, a powered conveyor means on said frame means rearwardly of said rotor means extending upwardly and rearwardly therefrom adapted to receive said debris on its forward end and to convey the same upwardly and rearwardly, and a hopper means on said frame means rearwardly of said conveyor means adapted to receive the debris passing from the rearward end of said conveyor means, said hopper means including a hopper gate at its rearward end which normally closes the rearward end of said hopper means, and hopper gate being pivotal at its upper end about a horizontal axis from its closed position to an open position, said hopper gate including a bottom wall portion which merges into an upstanding real wall portion, said bottom wall portion forming the substantial bottom wall of said hopper whereby upon said gate being pivoted rearwardly the debris is carried with said gate until said gate reaches a substantial horizontal position whereupon said debris is released into a pile on the ground.

16. The means of claim 15 wherein said hopper gate includes hydraulic cylinder means connected thereto for pivoting said hopper gate between its open and closed positions.

* * * * *